US010549367B2

(12) United States Patent
Tuboguchi

(10) Patent No.: US 10,549,367 B2
(45) Date of Patent: Feb. 4, 2020

(54) NUMERICAL CONTROLLER FOR WIRE ELECTRICAL DISCHARGE MACHINE ADAPTED FOR CORNER CONTROL OF MINUTE BLOCKS

(71) Applicant: FANUC Corporation, Minamitsuru-gun, Yamanashi (JP)

(72) Inventor: Yuji Tuboguchi, Minamitsuru-gun (JP)

(73) Assignee: FANUC Corporation, Minamitsuru-gun, Yamanashi (JP)

(*) Notice: Subject to any disclaimer, the term of this patent is extended or adjusted under 35 U.S.C. 154(b) by 171 days.

(21) Appl. No.: 15/148,301

(22) Filed: May 6, 2016

(65) Prior Publication Data
US 2016/0346853 A1 Dec. 1, 2016

(30) Foreign Application Priority Data

May 29, 2015 (JP) ................................. 2015-109453

(51) Int. Cl.
*B23H 1/02* (2006.01)

(52) U.S. Cl.
CPC ...................................... *B23H 1/02* (2013.01)

(58) Field of Classification Search
CPC . B23H 1/02; B23H 7/065; B23H 7/20; B23H 7/06; G05B 19/4093; G05B 19/41; G05B 2219/45221; G05B 2219/45043; Y02P 90/265
USPC ........................................ 219/69.12; 700/162
See application file for complete search history.

(56) References Cited

U.S. PATENT DOCUMENTS

| | | | | |
|---|---|---|---|---|
| 4,518,842 A | * | 5/1985 | Obara | B23H 7/065 219/69.12 |
| 4,520,253 A | * | 5/1985 | Gamo | B23H 7/065 219/69.12 |
| 4,523,073 A | * | 6/1985 | Gamo | B23H 7/065 219/69.12 |
| 5,021,622 A | * | 6/1991 | Magara | B23H 7/065 219/69.12 |
| 5,410,117 A | * | 4/1995 | Reynier | B23H 7/04 219/69.12 |

(Continued)

FOREIGN PATENT DOCUMENTS

| | | |
|---|---|---|
| EP | 0915404 A1 | 5/1999 |
| EP | 1389749 A2 | 2/2004 |

(Continued)

OTHER PUBLICATIONS

Translation JP 04322913.*

(Continued)

*Primary Examiner* — Ibrahime A Abraham
*Assistant Examiner* — Frederick F Calvetti
(74) *Attorney, Agent, or Firm* — Drinker Biddle & Reath LLP

(57) ABSTRACT

A numerical controller for controlling a wire electrical discharge machine generates section data such that a machining path commanded by a machining program is divided into sections with a sufficient distance, generates data such that the individual sections are re-approximated to a straight line or a circular arc based on the generated section data, and adjusts an operation of the wire electrical discharge machine at a corner portion and a circular-arc portion of the machining path, based on the re-approximation section data.

20 Claims, 12 Drawing Sheets

(56) References Cited

U.S. PATENT DOCUMENTS

| | | | | |
|---|---|---|---|---|
| 5,504,294 A * | 4/1996 | Izumiya | ............. | B23H 7/06 219/69.12 |
| 5,723,961 A * | 3/1998 | Fujino | ............. | G05B 19/4103 318/568.15 |
| 6,100,493 A * | 8/2000 | Takegahara | ......... | G05B 19/4099 219/69.12 |
| 6,774,334 B1 | 8/2004 | Kobayashi | | |
| 6,832,126 B2 * | 12/2004 | Irie | ............. | B23H 7/065 219/69.11 |
| 8,829,383 B2 * | 9/2014 | Onodera | ............. | B23H 7/065 219/69.12 |
| 9,268,323 B2 * | 2/2016 | Otsuki | ............. | G05B 19/19 |
| 9,796,034 B2 * | 10/2017 | Irie | ............. | B23H 7/065 |
| 2004/0122549 A1 * | 6/2004 | Otsuki | ............. | G05B 19/4103 700/189 |
| 2008/0251500 A1 * | 10/2008 | Hiraga | ............. | B23H 7/065 219/69.12 |
| 2010/0187204 A1 * | 7/2010 | Angelella | ............. | B23H 7/06 219/69.13 |
| 2011/0100959 A1 * | 5/2011 | Onodera | ............. | B23H 7/065 219/69.13 |
| 2011/0226742 A1 * | 9/2011 | Onodera | ............. | B23H 7/065 219/69.13 |
| 2013/0218323 A1 * | 8/2013 | Otsuki | ............. | G05B 19/19 700/187 |
| 2014/0190940 A1 * | 7/2014 | Hiraga | ............. | B23H 7/06 219/69.12 |
| 2014/0330423 A1 * | 11/2014 | Hara | ............. | B23H 7/065 700/162 |
| 2015/0112473 A1 * | 4/2015 | Hasegawa | ............. | B23H 1/02 700/162 |
| 2015/0183039 A1 * | 7/2015 | Irie | ............. | B23H 7/065 219/69.12 |
| 2015/0239055 A1 * | 8/2015 | Niu | ............. | B23H 1/02 219/69.12 |
| 2015/0266122 A1 * | 9/2015 | Nakagawa | ............. | B23H 1/02 700/162 |

FOREIGN PATENT DOCUMENTS

| | | |
|---|---|---|
| JP | S58-120428 A | 7/1983 |
| JP | H04-322913 A | 11/1992 |
| JP | H05-228736 A | 9/1993 |
| JP | H09-35054 A | 2/1997 |
| JP | 2010-198380 A | 9/2010 |
| JP | 2011-186939 A | 9/2011 |
| JP | 2013-171376 A1 | 9/2013 |
| JP | 2014-148036 A | 8/2014 |
| JP | 2015-77670 A | 4/2015 |

OTHER PUBLICATIONS

Translation JP 2011186939 (Year: 2019).*
Extended European Search Report dated Nov. 10, 2016 in European Patent Application No. 16170009.1.
Notification of Reasons for Refusal dated Jun. 27, 2017 in Japanese Patent Application No. 2015-109453 (6 pages) with an English translation (4 pages).
Decision to Grant a Patent dated Dec. 5, 2017 in Japanese Patent Application No. 2015-109453 (3 pages) with an English Translation (3 pages).

* cited by examiner

RE-APPROXIMATED
TO CIRCULAR ARC ⇒ ARC CONTROL

RE-APPROXIMATED TO STRAIGHT LINE OR CIRCULAR ARC

⇒ SUFFICIENT DISTANCE FOR CORNER CONTROL

RE-APPROXIMATED TO STRAIGHT LINE OR
CIRCULAR ARC

⇩

NO NEED OF CORNER CONTROL

CONVENTIONAL INTERPOLATION OF MINUTE LINE SEGMENTS
OR MINUTE ARCS

▨ : BITE
▦ : RESIDUE

CONVENTIONAL INTERPOLATION OF SMOOTHED CURVE

▨ : BITE
▦ : RESIDUE

INTERPOLATION OF MINUTE LINE SEGMENTS OR MINUTE ARCS OF INVENTION

INTERPOLATION OF SMOOTHED CURVE OF INVENTION

NO CORNER CONTROL

MACHINING CONDITION CONTROL

MACHINING PATH CORRECTION

NUMERICAL CONTROLLER FOR WIRE ELECTRICAL DISCHARGE MACHINE ADAPTED FOR CORNER CONTROL OF MINUTE BLOCKS

RELATED APPLICATION DATA

This application claims priority under 35 U.S.C. § 119 and/or § 365 to Japanese Application No. 2015-109453 filed May 29, 2015, the entire contents is incorporated herein by reference.

BACKGROUND OF THE INVENTION

Field of the Invention

The present invention relates to a numerical controller, and more particularly, to a numerical controller with the function of performing corner control of minute blocks.

Description of the Related Art

During machining by a wire electrical discharge machine, a wire electrode 2 is deflected (wire electrode 2') in the direction opposite to a machining progress direction 3 by a discharge repulsive force or a machining fluid flow, as shown in FIGS. 9A and 9B. In FIG. 9B, reference numerals 3a and 3b denote upper and lower wire guides, respectively, and reference numeral 4 denotes a workpiece.

If machining is performed without the consideration of the influence of the deflection of the wire electrode 2, inward turning occurs at corner portions and circular-arc portions due to the deflection (wire electrode 2') of the central portion of the wire electrode 2 with respect to the thickness direction of the workpiece (vertical direction in FIG. 9B). Thus, a command shape involves bites and residues, as shown in FIG. 10A (corner portion) and FIG. 11A (circular-arc portion). In FIG. 10A and its subsequent drawings, reference numeral 2a denotes a command position of the wire electrode 2, and reference numeral 2b denotes the position of the central portion of the wire electrode 2 shifted by the deflection, with respect to the thickness direction of the workpiece.

Japanese Patent Applications Laid-Open Nos. 58-120428, 05-228736, 2014-148036, etc., disclose conventional techniques to overcome the problem that the command shape involves bites and residues due to the deflection of the wire electrode. According to these techniques, automatic adjustment of machining conditions (electrical discharge conditions) and a machining speed (machining condition control) and automatic correction of a machining path (machining path correction) are performed at corner portions and circular-arc portions.

By these conventional techniques, the machining conditions are changed when the corner portion and the circular-arc portion of the machining path are approached by the wire electrode 2, as shown in FIG. 10B (corner portion) and FIG. 11B (circular-arc portion), and the amount of deflection is reduced by controlling the discharge voltage and the pressure or amount of a machining fluid to reduce a pressure on the wire electrode 2. In this way, the bites and residues at the corner portion and the circular-arc portion can be reduced.

Also, the bites and residues at the corner portion and the circular-arc portion can be reduced by correcting a command path for the wire electrode 2 so that a deflected portion of the wire electrode can move along the command path, as shown in FIG. 10C (corner portion) and FIG. 11C (circular-arc portion).

The machining condition control and the machining path correction described above are performed based on shape data (block length, corner angle, arc radius, arc central angle, etc.) on the machining path calculated by a numerical controller.

In machining a free curve shape, a command shape is generally approximated by minute blocks, such as minute line segments or minute arcs. Such a command shape is generated based on an analysis of the free curve shape by a CAD/CAM system or the like.

The conventional techniques in which the machining condition control and the machining path correction are performed at the corner portions and the circular-arc portions are configured so that corner shape data is calculated block by block. Therefore, the following problems occur if the minute line segments or minute arcs used in the machining of the free curve shape are interpolated.

[Problem 1] Arc control cannot be performed even for a machining path having a curve shape with a small curvature radius:

In approximating a free curve shape by minute line segments or minute arcs, the curve shape is approximated by a shape including a plurality of minute line segments. There is a problem that if a set of such minute line segments (part (a) shown in FIG. 12A) is directly interpolated, an interpolation path is polygonal-line-shaped, as shown in FIG. 12B, so that arc control cannot be achieved.

[Problem 2] A necessary control distance for corner control cannot be secured:

A certain control distance is needed to achieve corner control at a corner portion (part (b) shown in FIG. 12A) by the conventional techniques. Since the corner shape data is calculated block by block according to the conventional techniques, however, there is a problem that the necessary control distance for corner control cannot be secured at an acute corner between the minute blocks, as shown in FIG. 12C.

[Problem 3] Calculation errors and the like of the CAD/CAM system cannot be overcome:

If the free curve shape is analyzed by the CAD/CAM system and approximated by minute line segments or minute arcs, a very minute difference in level (part (c) shown in FIG. 12A) may sometimes be created in the command shape due to calculation errors or the like. There is a problem that if the conventional corner control is directly applied to the command shape, an acute corner is inevitably subjected to the corner control for a substantially smooth curve shape, as shown in FIG. 12D.

There is an additional problem that if a method is employed in which curves (spline curve, NURBS curve, quadratic curve other than a circular arc, etc.) obtained by smoothing minute line segments or minute arcs are interpolated, instead of directly interpolating the minute line segments or minute arcs, no conventional techniques can perform the machining condition control and the machining path correction based on shape data on these curves, so that proper corner control and arc control cannot be achieved.

SUMMARY OF THE INVENTION

Accordingly, the object of the present invention is to provide a numerical controller configured so that wire electrical discharge machining of a free curve shape approximated by minute line segments or minute arcs can be performed with high precision.

A numerical controller according to the present invention controls a wire electrical discharge machine which performs machining by relatively moving a wire electrode and a workpiece according to a machining program. The numerical controller comprises section division unit configured to generate section data such that a machining path commanded by the machining program is divided into sections with a sufficient distance, re-approximation unit configured to generate re-approximation section data such that the individual sections are re-approximated to a straight line or a circular arc based on the section data, and machining adjustment unit configured to adjust an operation of the wire electrical discharge machine at a corner portion and a circular-arc portion of the machining path, based on the re-approximation section data.

The machining program may comprise a plurality of minute blocks.

The numerical controller can further comprise smoothing unit configured to generate smoothing curve data by smoothing the machining path commanded by the machining program. The section division unit may be configured to generate section data such that a machining path commanded by the smoothing curve data is divided into sections with a sufficient distance, and the machining adjustment unit may be configured to adjust the operation of the wire electrical discharge machine at a corner portion and a circular-arc portion of the machining path commanded by the smoothing curve data, based on the re-approximation section data.

The machining adjustment unit can comprise machining condition control unit configured to control a machining condition at the corner portion and the circular-arc portion of the machining path based on the re-approximation section data.

The machining condition controlled by the machining adjustment unit may be discharge energy output from a machining power supply or the supply pressure or supply amount of machining fluid.

The machining adjustment unit can comprise machining path correction unit configured to correct the machining path at the corner portion and the circular-arc portion thereof, based on the re-approximation section data.

According to the present invention, shape data is calculated by re-approximating a commanded sequence of points or a curve obtained by smoothing the same to a straight line or a circular arc and conventional corner control and arc control are applied in wire electrical discharge machining of a free curve shape approximated by minute line segments or minute arcs, whereby high-precision wire electrical discharge machining can be achieved.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

In the present invention, a free curve shape approximated by minute line segments or minute arcs is first divided into a plurality of sections with a sufficient distance, based on dividing points at which the direction and curvature radius change considerably. Section division (dividing point setting) of the free curve shape is performed according to the following rules.

[Rule D1]: Both ends of a long block not shorter than a predetermined block length Ld are set as the dividing points, and this single block is regarded as one section.

[Rule D2]: For a short block not longer than a predetermined block length Lmin, checks for direction change (checks to which Rules D3 and D4 are applied) are not made and the midpoint of the block is set as the most approximate control point.

[Rule D3]: If an angle formed between the respective tangential directions of the start point of a certain block and the end point of the previous block is not less than a predetermined angle $\theta d$, the shape is then divided into one section.

[Rule D4]: If the curvature radius change is not less than a predetermined rate Rd or if the center direction of a circular arc is reversed with respect to a machining path, the shape is then divided into one section.

Then, each divided section is re-approximated to a straight line or a circular arc according to the following rules and shape data is calculated.

[Rule F1]: A section comprising a single block is not re-approximated.

[Rule F2]: If the curvature radius of each divided section is not less than a predetermined value Rt, the section is re-approximated to a straight line that connects its start and end points.

[Rule F3]: Sections other than the one described above are re-approximated to circular arcs by the least squares method or the like.

Interpolation processing is performed based on data on the minute line segments or arcs or data on a smooth curve obtained by smoothing, while corner control and arc control (machining condition control and machining path correction) are performed based on shape data on a straight line or circular arc to which the section is re-approximated.

Figure 1A:
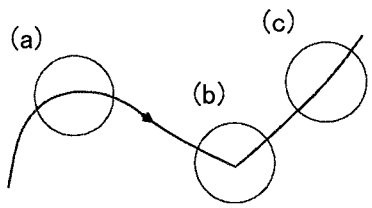
FIGS. 1A, 1B, 1C and 1D are diagrams illustrating section division and re-approximation of a machining path performed by a numerical controller according to the present invention.
Figure 1B:
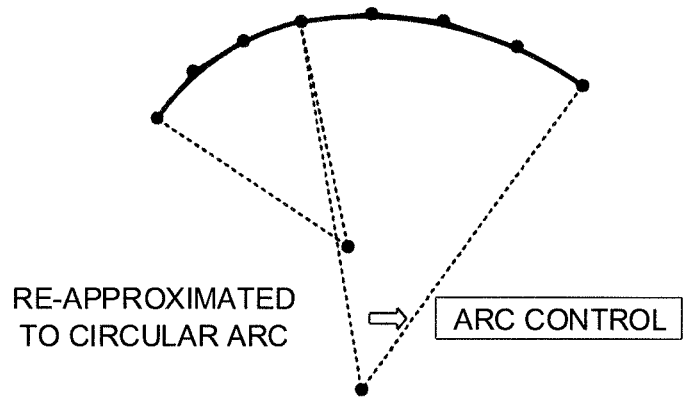

Since the section division and the re-approximation are performed according to the above-described rules, even if a curve shape with a small curvature radius is approximated by minute line segments, such as those at a part (a) shown in FIG. 1A, those minute line segments with curvature radii in similar ranges are regarded as a single section and re-approximated as a circular arc (Rules D2, D4 and F3), as shown in FIG. 1B. Thus, the arc control can be performed properly (solution to Problem 1).

Figure 1C:
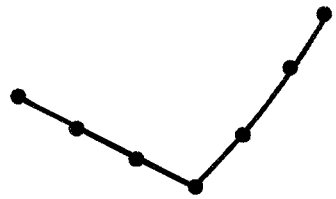

Further, minute blocks around an acute corner, such as those at a part (b) shown in FIG. 1A, are each re-approximated to a straight line or a circular arc (Rules D2, D3, F2 and F3), as a single section, as shown in FIG. 1C. Thus, a necessary control distance for the corner control can be secured (solution to Problem 2).

Figure 1D:
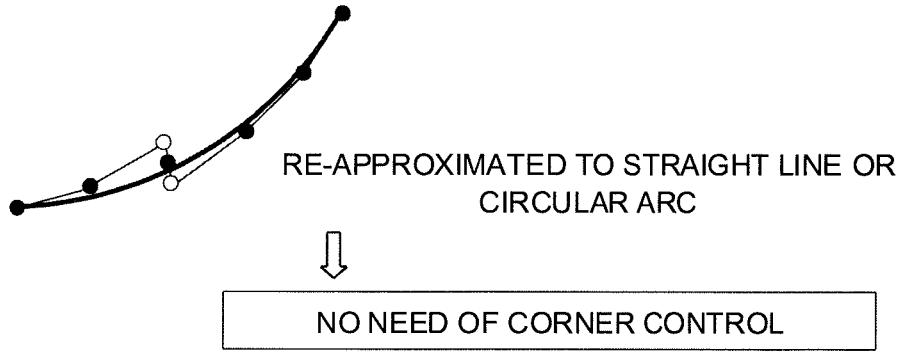

Even if a minute difference in level, such as that at a part (c) shown in FIG. 1A, is formed in a command shape, moreover, direction change is not checked for those blocks which define the difference in level, and the blocks around these defining blocks are re-approximated to smooth straight lines or curves (Rules D2, D3, F2 and F3), as shown in FIG. 1D. Thus, the corner control can be deterred in these portions (solution to Problem 3).

Figure 2:
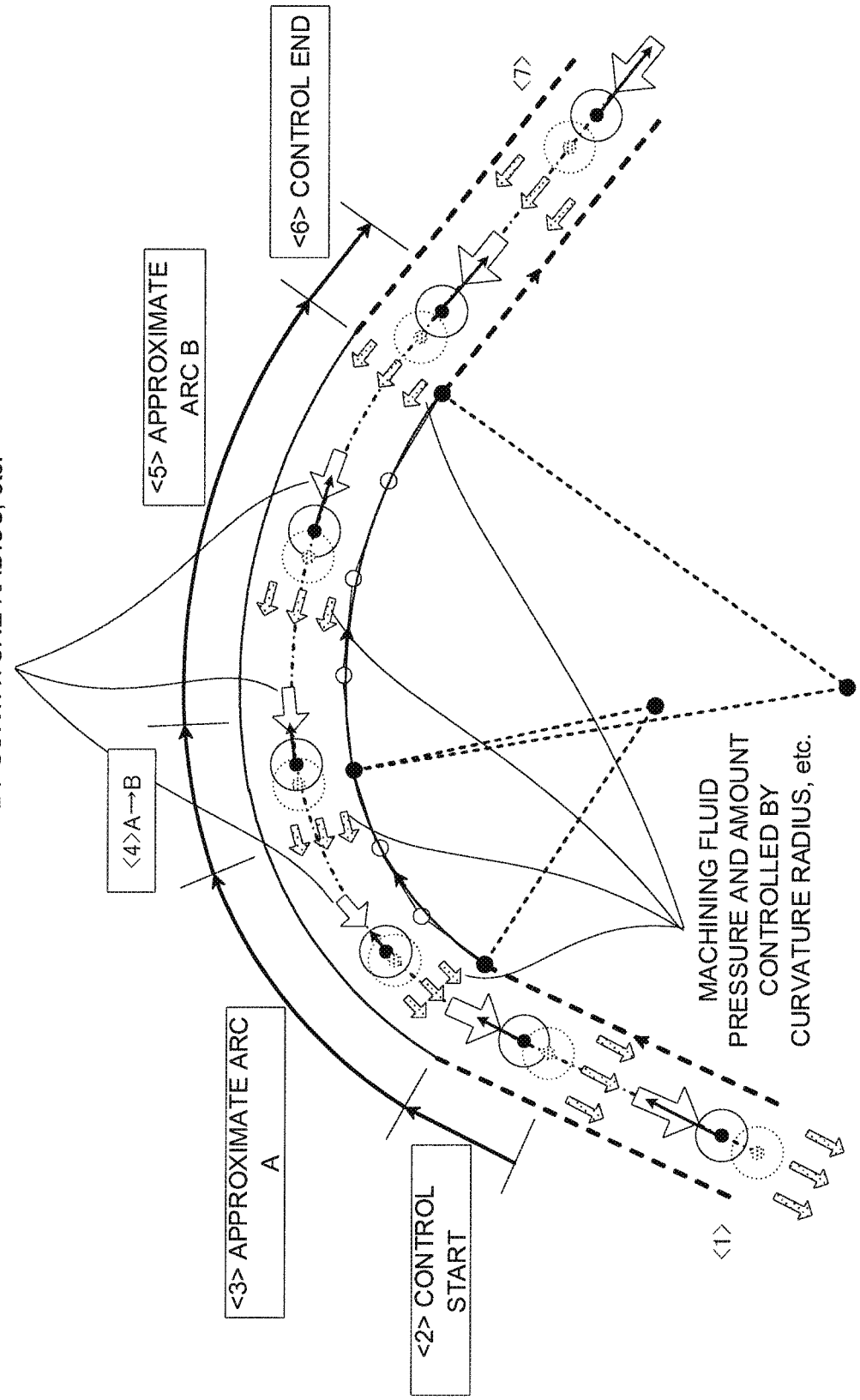
FIG. 2 is a diagram illustrating an example in which the numerical controller of the present invention performs machining condition control based on shape data on re-approximated circular arcs.

FIG. 2 shows an example of the machining condition control based on shape data on circular arcs to which the sections are re-approximated.

In FIG. 2, a free curve shape from Point <1> to Point <7> approximated by minute line segments is divided into two sections (Sections <3> and <5>) with respect to a dividing point (Point <4>) at which the curvature radius changes considerably, and the divided sections are individually re-approximated to two approximate arcs A and B.

As shown in FIG. 2, a numerical controller performs the machining condition control so that deflection of a wire electrode is suppressed by reducing the voltage of the machining power supply, the supply pressure and amount of a machining fluid, or the like, based on the respective section lengths, corner angles to the surrounding sections, arc radii, arc central angles, and the like of the approximate arcs A and B, if the curvature radius is small, for example. This machining condition control is performed by adjusting the machining power supply, machining fluid supply unit, and the like of a wire electrical discharge machine. The machining condition control may be replaced with the machining path correction.

Since the details of the machining condition control and the machining path correction are disclosed in Japanese Patent Applications Laid-Open Nos. 58-120428, 05-228736, 2014-148036, etc., described before, a description thereof will be omitted.

Figure 3A:
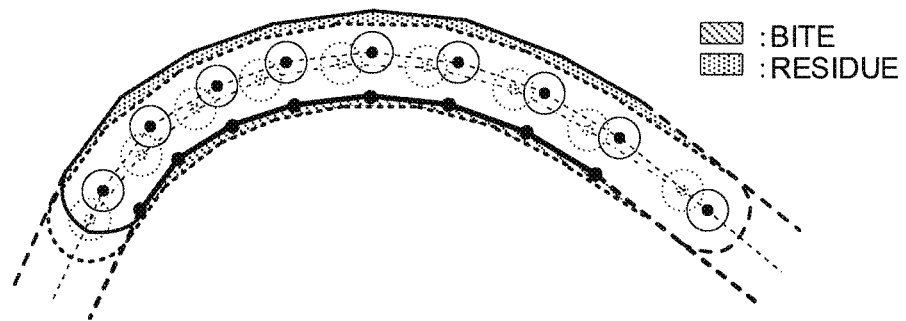
FIGS. 3A and 3B are diagrams showing states of wire electrical discharge machining of a curve shape to which only conventional techniques are applied.
Figure 3B:
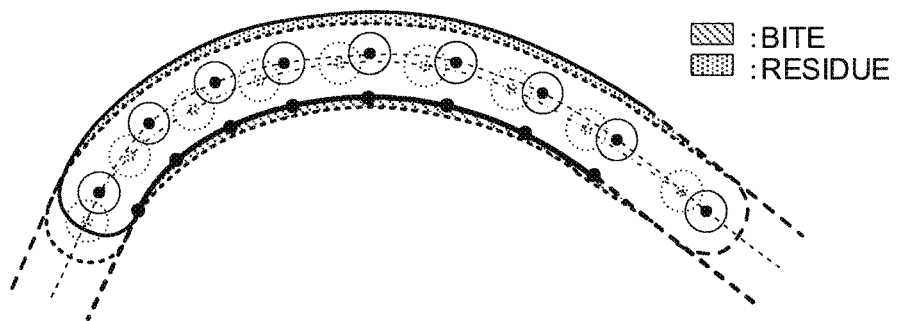
Figure 4A:
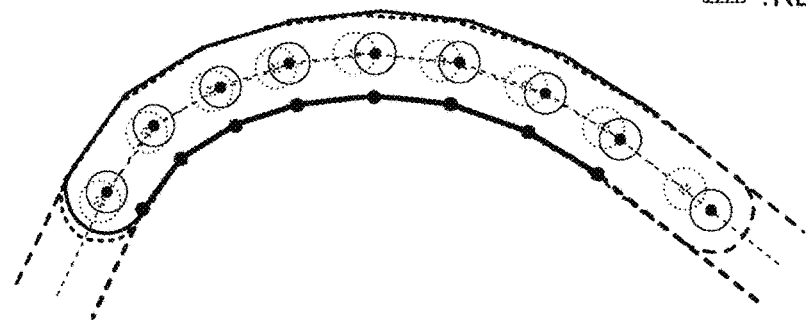
FIGS. 4A and 4B are diagrams showing states of wire electrical discharge machining of a curve shape to which the present invention is applied.
Figure 4B:
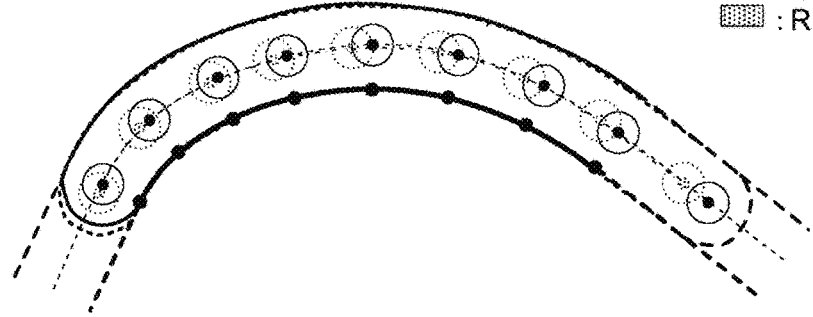

FIGS. 3A and 3B are diagrams showing states of wire electrical discharge machining of a curve shape to which only the conventional techniques are applied. FIGS. 4A and 4B are diagrams showing states of wire electrical discharge machining of a curve shape to which the present invention is applied.

If the curve shape is approximated by a plurality of minute line segments to be interpolated, as shown in FIG. 3A, an interpolation path is polygonal-line shaped. Individual blocks are linear blocks and the direction change between each two adjacent blocks is small. Therefore, the machining condition control cannot be achieved by the application of the conventional techniques only, so that bites and residues are caused by wire deflection.

If the present invention is applied to interpolation of the polygonal-line shape shown in FIG. 3A, in contrast, the plurality of minute line segments are regarded as a single section and re-approximated to circular-arc shape data in the machining condition control, the applied machining condition control is based on the circular-arc shape data, as a result, deflection of a wire electrode becomes small, as shown in FIG. 4A, so that the bites and residues are reduced and high-precision machining can be achieved.

When curves (spline curve, NURBS curve, quadratic curve other than a circular arc, etc.) obtained by smoothing minute line segments are interpolated, as shown in FIG. 3B, on the other hand, the machining condition control cannot be performed based on shape data on these curves even if the conventional techniques is simply applied to the interpolation of such curves. Consequently, bites and residues are caused by wire deflection.

If the present invention is applied to interpolation of the smoothed curves shown in FIG. 3B, in contrast, the curves are divided into sections and these divided sections are re-approximated to the circular-arc shape data and the machining condition control is performed based on the re-approximated circular-arc shape data. Thus, since the deflection of the wire electrode is reduced, as shown in FIG. 4B, the bites and residues are also reduced, so that high-precision machining can be achieved.

Figure 5:
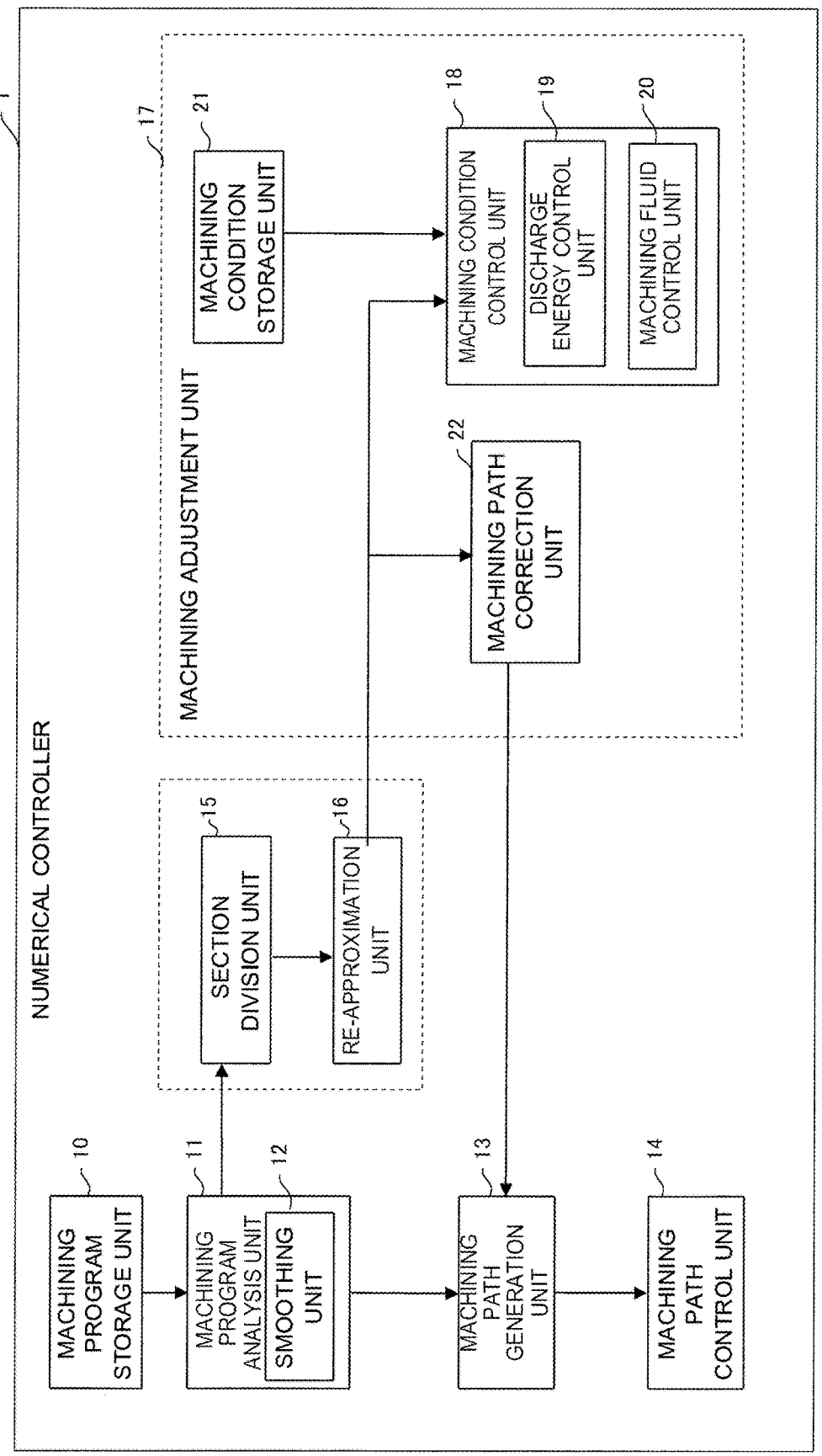
FIG. 5 is a functional block diagram of a numerical controller according to one embodiment of the present invention.

FIG. 5 is a functional block diagram of a numerical controller according to one embodiment of the present invention.

A numerical controller 1 comprises a machining program storage unit 10, a machining program analysis unit 11, a smoothing unit 12, a machining path generation unit 13, a machining path control unit 14, a section division unit 15, a re-approximation unit 16, a machining adjustment unit 17, a machining condition control unit 18, a discharge energy control unit 19, a machining fluid control unit 20, a machining condition storage unit 21, and a machining path correction unit 22.

The machining program analysis unit 11 sequentially reads machining programs stored in the machining program storage unit 10, loads them in a buffer area on a memory (not shown), and analyzes the machining programs.

The smoothing unit 12 operates as sub-function means of the machining program analysis unit 11. When smoothing is enabled by setting in the numerical controller 1 or a command from a machining program, the smoothing unit 12 performs generation processing of smoothing curve data (spline curve, NURBS curve, quadratic curve other than a circular arc, etc.) based on block data in the machining program.

The machining path generation unit 13 creates interpolation data based on the result of the analysis by the machining program analysis unit 11, thereby generating a machining path based on the block data in the machining program. Further, the machining path control unit 14 controls axes of the wire electrical discharge machine based on the machining path generated by the machining path generation unit 13, thereby controlling the machining path during a machining operation.

The section division unit 15 applies section division processing based on Rules D1 to D4 described above to the result of the analysis by the machining program analysis unit 11 to generate section data. Further, the re-approximation unit 16 applies re-approximation processing based on Rules F1 to F3 described above to the section data generated by the section division unit 15 to generate re-approximation section data.

The machining adjustment unit 17 comprises the machining condition control unit 18 and the machining path correction unit 22 as sub-function means and adjusts the machining operation of the wire electrical discharge machine at corner portions and circular-arc portions of the machining path.

The machining condition control unit 18 performs machining condition control at the corner portions and the circular-arc portions of the machining path based on the block data in the machining program, on the basis of the re-approximation section data generated by the re-approximation unit 16. This machining condition control is performed synchronously with the machining path control by the machining path control unit 14 based on the machining path generated by the machining path generation unit 13. Also, the machining condition control is performed in response to commands given to the discharge energy control unit 19 which controls discharge energy output from the machining power supply and the machining fluid control unit 20 which controls the supply pressure and amount of the machining fluid supplied to a machining area, based on data on machining conditions set for each machining status stored in the machining condition storage unit 21.

The machining path correction unit 22 performs machining path correction at the corner portions and the circular-arc portions of the machining path based on the block data in the machining program, on the basis of the re-approximation section data generated by the re-approximation unit 16. This machining path correction is performed synchronously with the machining path control by the machining path control unit 14 based on the machining path generated by the machining path generation unit 13. Also, the machining path correction is performed by directly correcting the machining path generated by the machining path generation unit 13 while meeting the circumstances of machining conditions controlled by the machining condition control unit 18.

Figure 6:
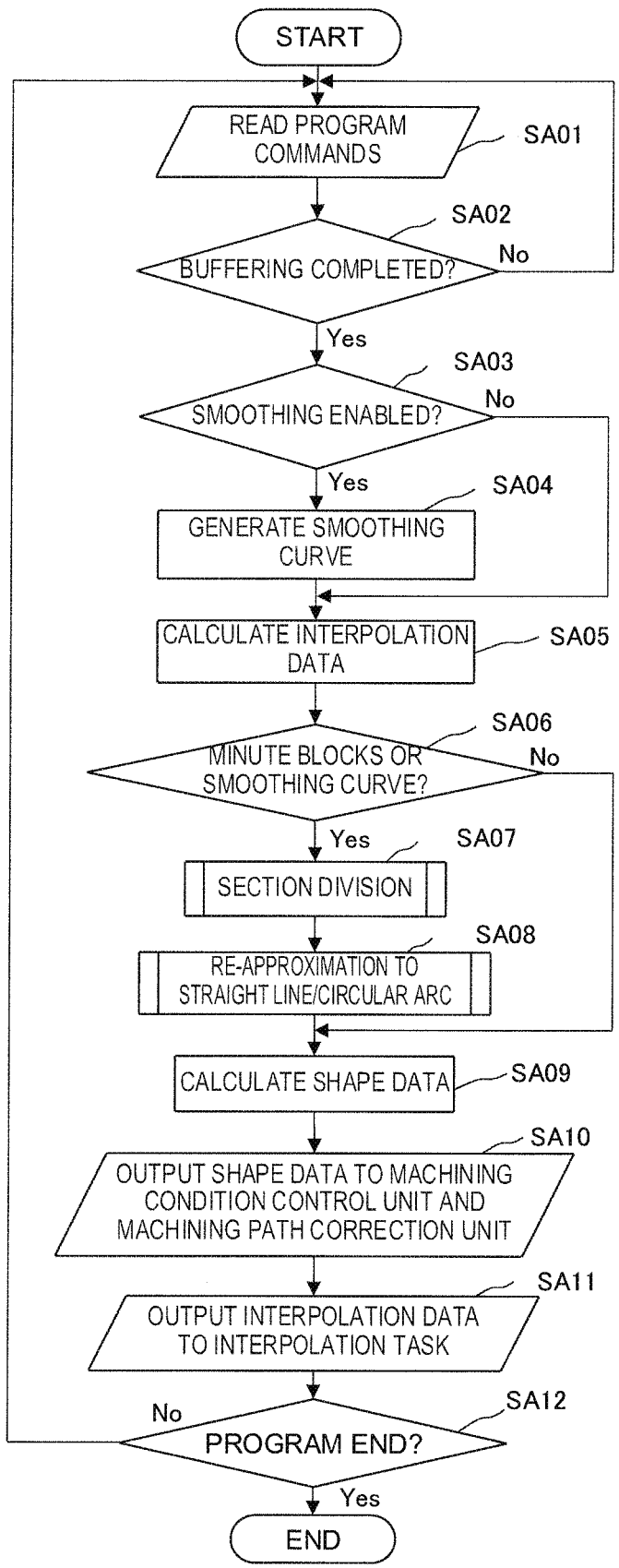
FIG. 6 is a flowchart showing an algorithm of processing performed on the numerical controller of FIG. 5.

FIG. 6 is a flowchart showing an algorithm of processing performed on the numerical controller according to one embodiment of the present invention.

[Step SA01] Program commands of a machining program to be executed are sequentially read from a nonvolatile memory or an external device into the buffer area on the memory.

[Step SA02] It is determined whether or not a sufficient number of program commands are buffered in the buffer area on the memory. If buffering of a sufficient number of program commands is completed, the processing proceeds to Step SA03. If not, the processing returns to Step SA01, whereupon reading is continued.

[Step SA03] It is determined whether or not smoothing is enabled by the setting in the numerical controller 1 or the command. If smoothing is enabled, the processing proceeds to Step SA04. If smoothing is disabled, the processing proceeds to Step SA05.

[Step SA04] The generation processing for the smoothing curve data (spline curve, NURBS curve, quadratic curve other than a circular arc, etc.) is performed based on the setting in the numerical controller 1.

[Step SA05] Interpolation processing is performed based the program commands or the smoothing curve data generated in Step SA04, whereby the interpolation data is generated.

[Step SA06] If the read program commands are minute blocks generated by a CAD/CAM system or the like or if the smoothing curve data is generated in Step SA04, the processing proceeds to Step SA07. If not, the processing proceeds to Step SA09. Whether or not the program commands are the minute blocks generated by the CAD/CAM system or the like may be determined by analyzing the program commands read in the buffer in the following manner. If a program includes a predetermined number N or more of blocks with a predetermined length $L_T$ or less for a machining distance commanded by the program commands, then it can only be determined that this program includes minute blocks generated by the CAD/CAM system or the like.

[Step SA07] The section data is generated by sequentially performing section division processing (described later) for the minute blocks or the smoothing curve data, starting from machining start position data.

[Step SA08] Re-approximation processing (described later) is performed for the section data generated in Step SA07 to generate the re-approximation section data.

[Step SA09] Shape data including information, such as a block length (section length), corner angle between each two adjacent blocks (sections), arc radius, arc central angle, and the like, is generated based on the buffered program commands or the re-approximation section data generated in Step SA08.

[Step SA10] The shape data generated in Step SA09 is output to a machining condition control unit and a machining path correction unit. In the machining condition control unit and the machining path correction unit, the machining condition control, such as corner control or arc control, and the machining path correction are performed synchronously with the progress of machining, based on the shape data.

[Step SA11] The interpolation data generated in Step SA05 is output to an interpolation task. In the interpolation task, the machining path control for wire electrical discharge machining is performed based on the interpolation data.

[Step SA12] It is determined whether or not the program is terminated. If the program commands are not terminated, the processing returns to Step SA01. If the program commands are terminated, this machining processing ends.

Figure 7:
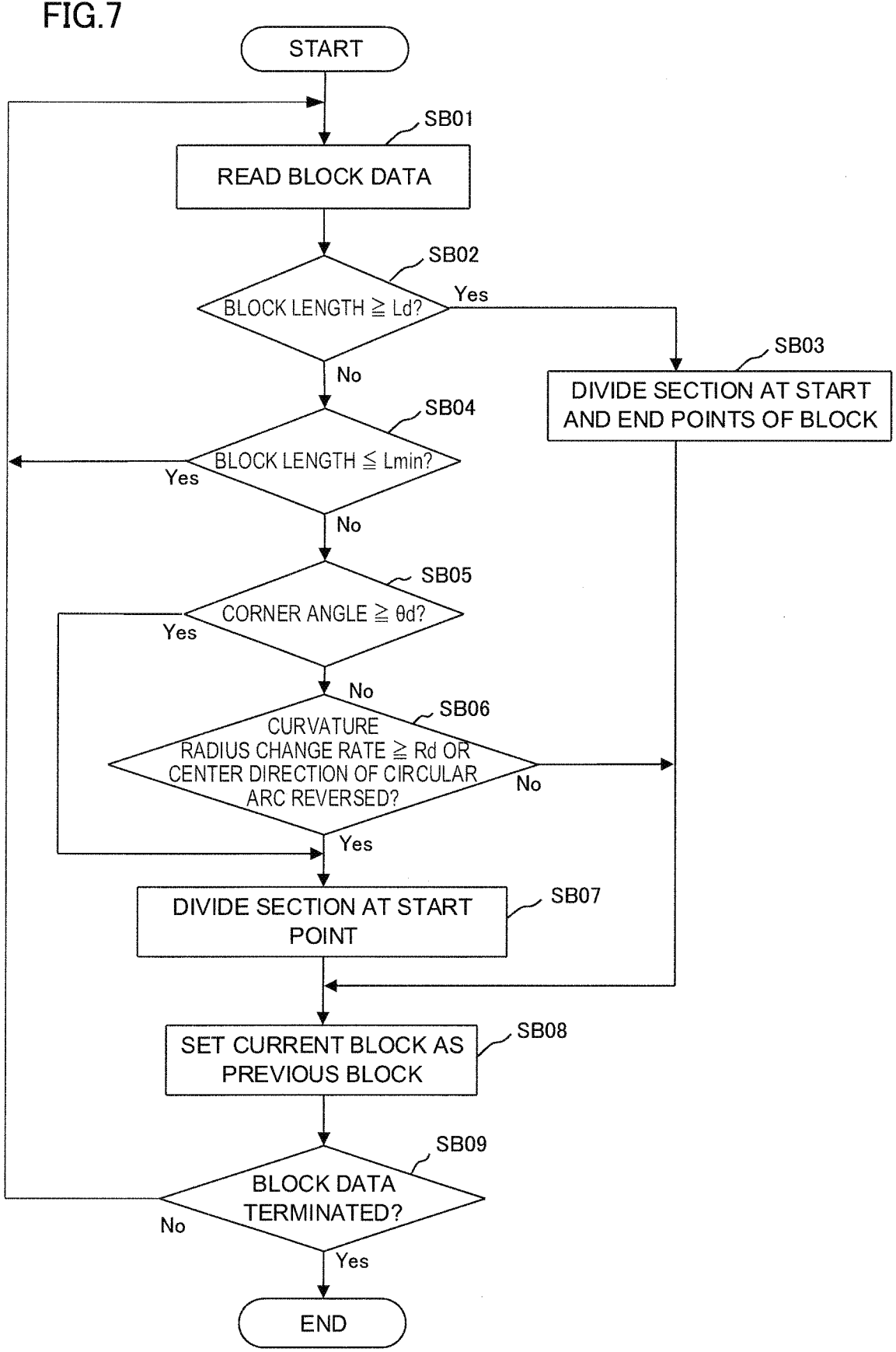
FIG. 7 is a flowchart showing an algorithm of section division processing performed on the numerical controller of FIG. 5.

FIG. 7 is a flowchart showing an algorithm of the section division processing performed on the numerical controller according to one embodiment of the present invention. In the section division processing, the section data is generated by sequentially applying Rules D1 to D4 described above to the minute blocks or the smoothing curve data, starting from the machining start position data.

[Step SB01] The block data stored in the buffer area is sequentially read.

[Step SB02] It is determined whether or not the block length of the block data read in Step SB01 is equal to or more than the predetermined block length Ld. If the block length is equal to or more than the predetermined block length Ld, the processing proceeds to Step SB03. If not, the processing proceeds to Step SB04.

[Step SB03] Both ends (start and end points) of a block being currently read are set as the dividing points and this single block is regarded as one section (Rule D1), whereupon the processing proceeds to Step SB08.

[Step SB04] It is determined whether or not the block length of the block data read in Step SB01 is equal to or less than the predetermined block length Lmin. If the block length is equal to or less than the predetermined block length Lmin, the midpoint of the block is set as the control point (corresponding to the end point of the previous block and the start point of the subsequent block), whereupon the processing returns to Step SB01. If not, the processing proceeds to Step SB05.

[Step SB05] It is determined whether or not the angle (corner angle) formed between the respective tangential directions of the start point of the block concerned and the end point of the previous block, read in Step SB01, is equal to or more than the predetermined angle θd. If the corner angle is equal to or more than the predetermined angle θd, the processing proceeds to Step SB07. If not or if the previous block is not set, the processing proceeds to Step SB06 (Rule D3).

[Step SB06] It is determined whether or not the rate of change of the curvature radius observed when the path in the block position read in Step SB01 is temporarily approximated to a circular arc, with respect to the curvature radius obtained when the path in the previous block position is temporarily approximated to a circular arc, is equal to or higher than the predetermined rate Rd, or whether or not the center directions of the circular arcs are opposite to each other with respect to the machining path. If either of these conditions is true, the processing proceeds to Step SB07. If not, the processing proceeds to Step SB08 (Rule D4).

[Step SB07] The start point of the block read in Step SB01 is set as the dividing point.

[Step SB08] The block read in Step SB01 is set as the previous block.

[Step SB09] It is determined whether or not the block data stored in the buffer area is terminated. If the block data is not terminated, the processing returns to Step SB01. If the block data is terminated, this section division processing ends.

Figure 8:
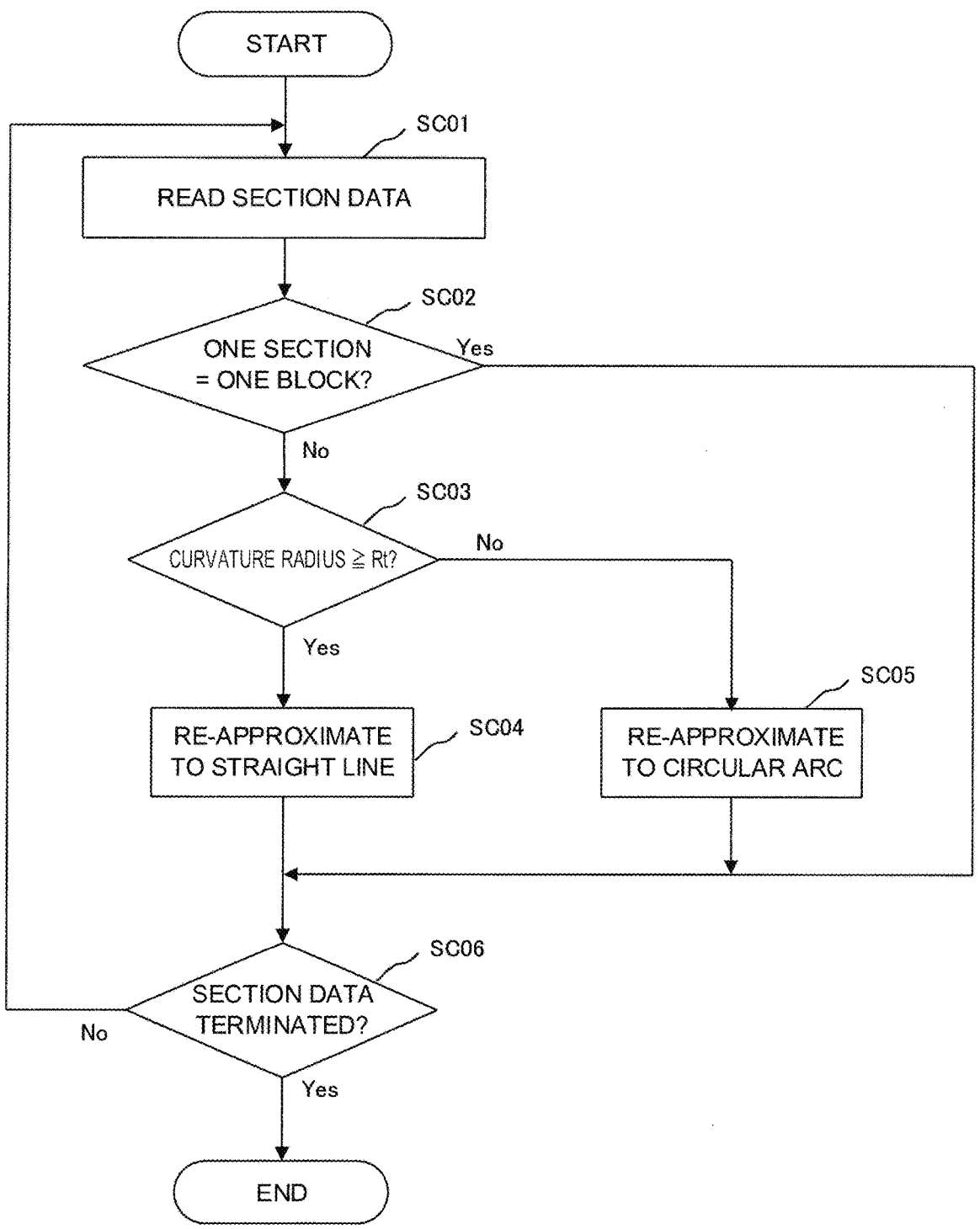
FIG. 8 is a flowchart showing an algorithm of re-approximation processing performed on the numerical controller of FIG. 5.
Figure 9A:
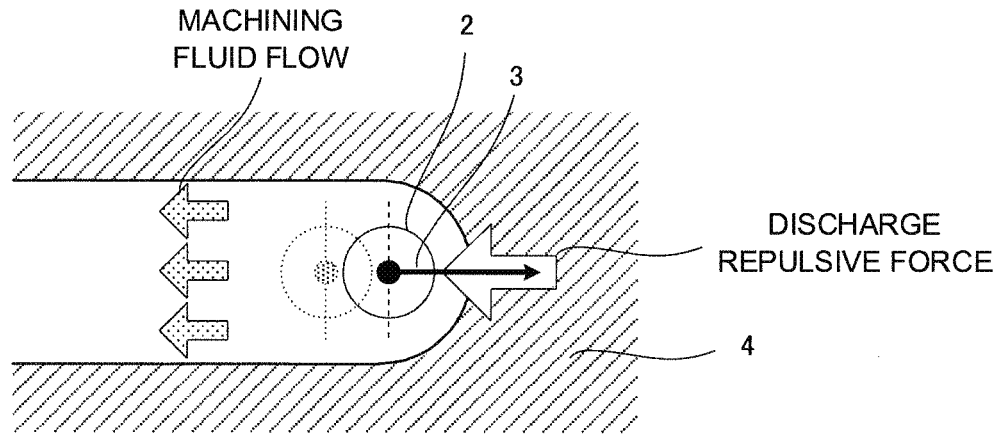
FIGS. 9A and 9B are views illustrating deflection of a wire electrode in wire electrical discharge machining.
Figure 9B:
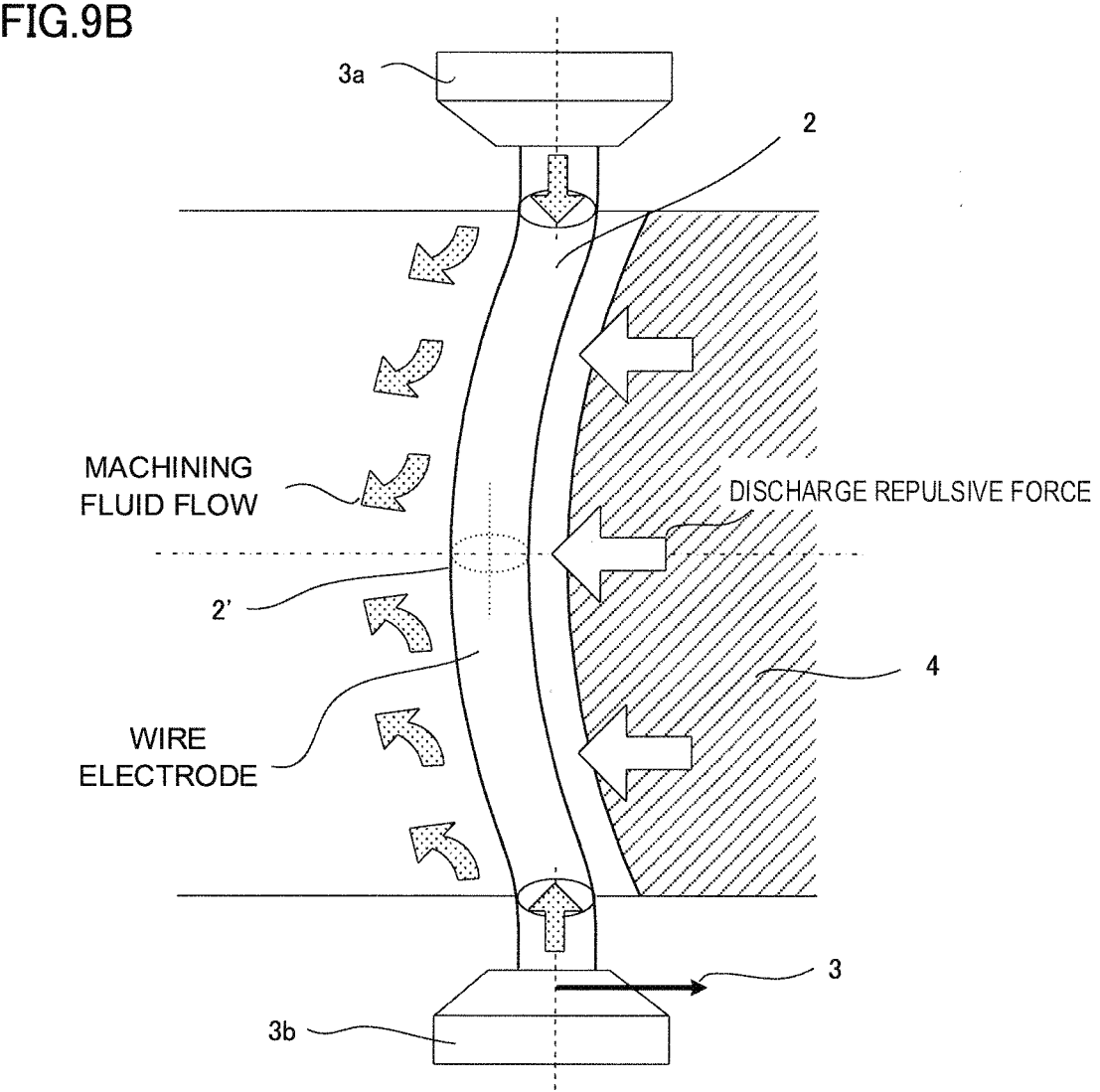
Figure 10A:
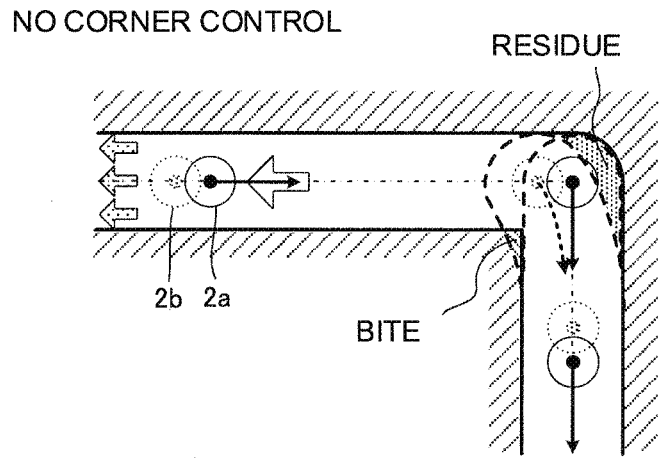
FIGS. 10A, 10B and 10O are views illustrating corner control at a corner portion of a conventional machining path.
Figure 10B:
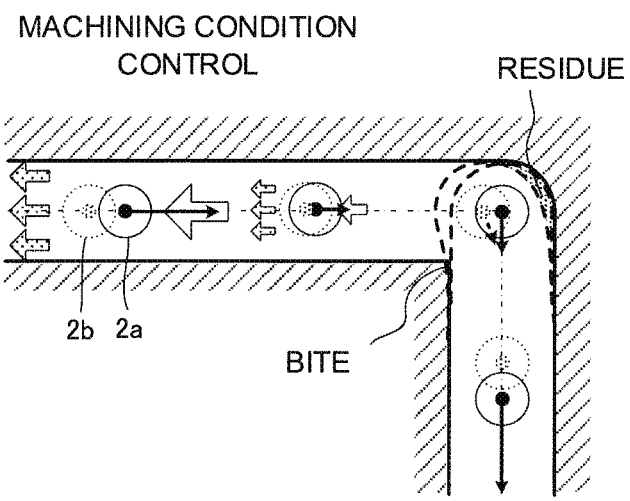
Figure 10C:
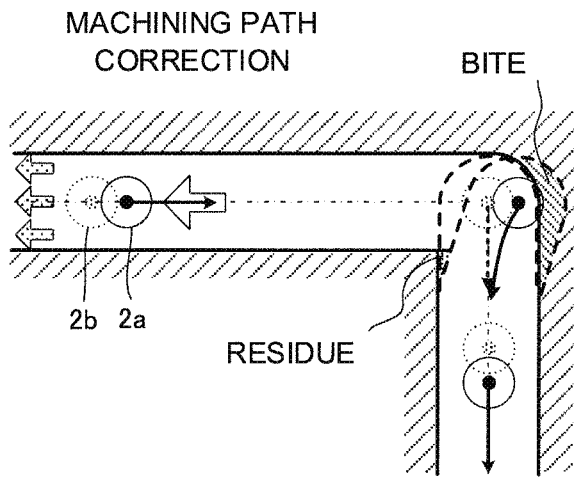
Figure 11A:
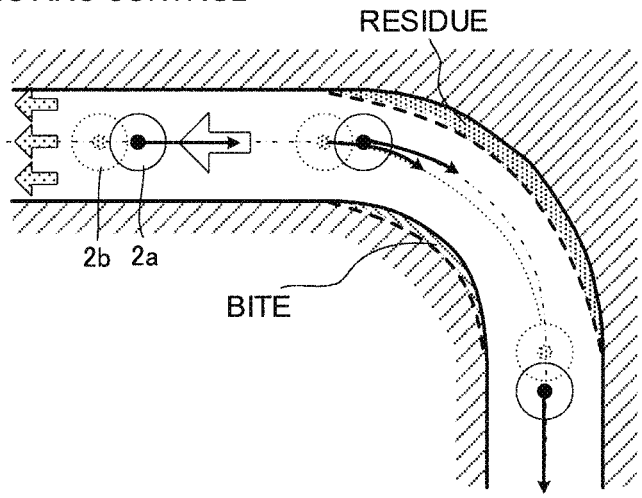
FIGS. 11A, 11B and 11C are views illustrating arc control at a circular-arc portion of the conventional machining path.
Figure 11B:
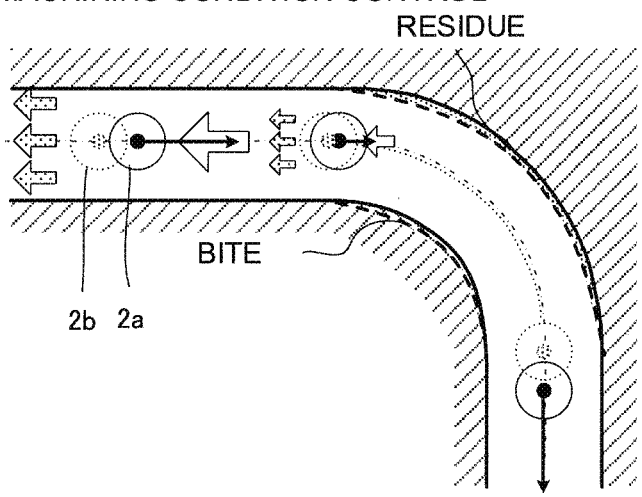
Figure 11C:
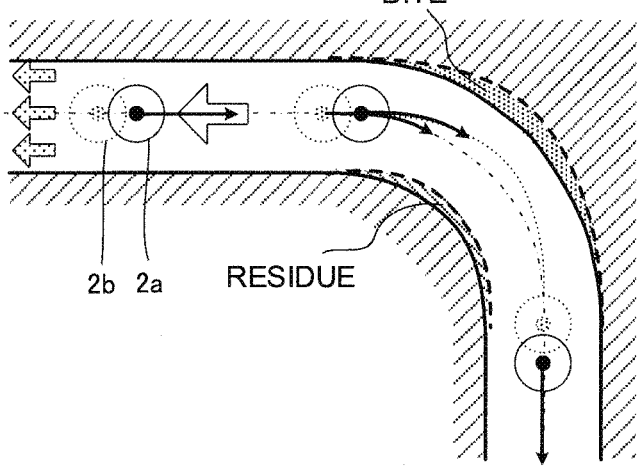
Figure 12A:
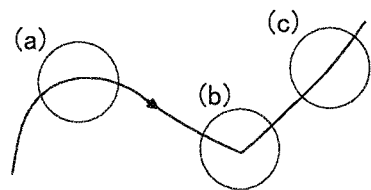
FIGS. 12A, 12B, 12C and 12D are diagrams illustrating problems caused when the conventional techniques are applied to machining of a curve shape based on minute line segments or minute arcs.
Figure 12B:
Figure 12C:
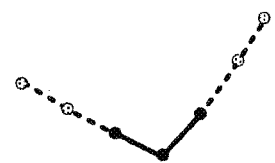
Figure 12D:
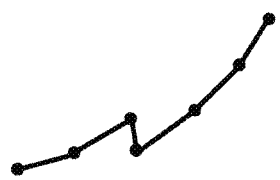

FIG. 8 is a flowchart showing an algorithm of the re-approximation processing performed on the numerical controller according to one embodiment of the present invention. In the re-approximation processing, the re-approximation section data is generated by sequentially applying Rules F1 to F3 described above to the section data generated in the section division processing, starting from the machining start position data.

[Step SC01] The section data generated in the section division processing is sequentially read.

[Step SC02] It is determined whether or not a section defined by the section data read in Step SC01 comprises a single block. If the section comprises a single block, the processing proceeds to Step SC06. If not, the processing proceeds to Step SC03 (Rule F1).

[Step SC03] It is determined whether or not the curvature radius obtained when the path in the section defined by the section data read in Step SC01 is temporarily approximated to a circular arc is equal to or more than the predetermined value Rt. If the curvature radius is equal to or more than the predetermined value Rd, the processing proceeds to Step SC04. If not, the processing proceeds to Step SC05.

[Step SC04] The section data read in Step SC01 is re-approximated to a straight line, whereupon the processing proceeds to Step SC06 (Rule F2).

[Step SC05] The section data read in Step SC01 is re-approximated to a circular arc, whereupon the processing proceeds to Step SC06 (Rule F3).

[Step SC06] It is determined whether or not the section data is terminated. If the section data is not terminated, the processing returns to Step SC01. If the section data is terminated, this re-approximation processing ends.

While an embodiment of the present invention has been described herein, the invention is not limited to the above-described embodiment and may be suitably modified and embodied in various forms.

According to the embodiment described above, for example, the numerical controller has been described as a device that performs both the machining condition control and the machining path correction. Alternatively, however, the numerical controller may be configured to perform only either the machining condition control or the machining path correction, depending on the scale of the system and the desired accuracy.

The invention claimed is:

1. A numerical controller configured to control a wire electrical discharge machine which performs machining by relatively moving a wire electrode and a workpiece according to a machining program, the numerical controller including a memory and a processor, the processor configured to perform a method comprising:
   reading the machining program, which is stored in the memory;
   generating section data such that a machining path commanded by the machining program is divided into sections according to the following method:
      reading a current block data of the machining program;
      setting a start point of the current block data and an end point of the current block data as dividing points of the current block data when a block length of the current block data is equal to or more than a predetermined long block length, thereby dividing the current block data into one section;
      setting a midpoint of the current block data as the dividing point of the current block data when the block length of the current block data is less than or equal to a predetermined short block length;
      setting a start point of the current block data as the dividing point of the current block data when a corner angle formed between respective tangential directions of the start point of the current block data and an end point of a previous block data is equal to or more than a predetermined angle; and
      setting the start point of the current block data as the dividing point of the current block data when a change rate of a curvature radius of an approximated circular arc of the current block data is greater than or equal to a predetermined rate, or, when a center direction of the current approximated circular arc is opposite in direction with respect to an approximated circular arc of the previous block data;
   generating re-approximation section data such that the individual sections are re-approximated to a straight line when the curvature radius of the current approximated circular arc is greater than or equal to the predetermined rate or are re-approximated to a circular arc when the curvature radius is less than the predetermined rate; and
   adjusting an operation of the wire electrical discharge machine at a corner portion and a circular-arc portion of the machining path, based on the re-approximation section data.

2. The numerical controller according to claim 1, wherein the machining program comprises a plurality of minute blocks that are blocks having a length equal to or less than a predetermined minute block length.

3. The numerical controller according to claim 1, wherein the processor is configured to perform a method comprising:
   generating smoothing curve data by smoothing the machining path commanded by the machining program;
   generating section data such that a machining path commanded by the smoothing curve data is divided into sections; and
   adjusting the operation of the wire electrical discharge machine at a corner portion and a circular-arc portion of the machining path commanded by the smoothing curve data, based on the re-approximation section data.

4. The numerical controller according to claim 1, wherein the processor is configured to perform a method comprising:
controlling a machining condition at the corner portion and the circular-arc portion of the machining path based on the re-approximation section data.

5. The numerical controller according to claim 4, wherein the machining condition is discharge energy output from a machining power supply or the supply pressure or supply amount of machining fluid.

6. The numerical controller according to claim 1, wherein the processor is configured to perform a method comprising:
correcting the machining path at the corner portion and the circular-arc portion thereof, based on the re-approximation section data.

7. The numerical controller according to claim 2, wherein the processor is configured to perform a method comprising:
generating smoothing curve data by smoothing the machining path commanded by the machining program;
generating section data such that a machining path commanded by the smoothing curve data is divided into sections; and
adjusting the operation of the wire electrical discharge machine at a corner portion and a circular-arc portion of the machining path commanded by the smoothing curve data, based on the re-approximation section data.

8. The numerical controller according to claim 2, wherein the processor is configured to perform a method comprising:
controlling a machining condition at the corner portion and the circular-arc portion of the machining path based on the re-approximation section data.

9. The numerical controller according to claim 3, wherein the processor is configured to perform a method comprising:
controlling a machining condition at the corner portion and the circular-arc portion of the machining path based on the re-approximation section data.

10. The numerical controller according to claim 7, wherein the processor is configured to perform a method comprising:
controlling a machining condition at the corner portion and the circular-arc portion of the machining path based on the re-approximation section data.

11. The numerical controller according to claim 8 wherein the machining condition is discharge energy output from a machining power supply or the supply pressure or supply amount of machining fluid.

12. The numerical controller according to claim 9 wherein the machining condition is discharge energy output from a machining power supply or the supply pressure or supply amount of machining fluid.

13. The numerical controller according to claim 10 wherein the machining condition is discharge energy output from a machining power supply or the supply pressure or supply amount of machining fluid.

14. The numerical controller according to claim 2, wherein the processor is configured to perform a method comprising:
the machining path at the corner portion and the circular-arc portion thereof, based on the re-approximation section data.

15. The numerical controller according to claim 3, wherein the processor is configured to perform a method comprising:
correcting the machining path at the corner portion and the circular-arc portion thereof, based on the re-approximation section data.

16. The numerical controller according to claim 4, wherein the processor is configured to perform a method comprising:
correcting the machining path at the corner portion and the circular-arc portion thereof, based on the re-approximation section data.

17. The numerical controller according to claim 5, wherein the processor is configured to perform a method comprising:
correcting the machining path at the corner portion and the circular-arc portion thereof, based on the re-approximation section data.

18. The numerical controller according to claim 7, wherein the processor is configured to perform a method comprising:
correcting the machining path at the corner portion and the circular-arc portion thereof, based on the re-approximation section data.

19. The numerical controller according to claim 8, wherein the processor is configured to perform a method comprising:
correcting the machining path at the corner portion and the circular-arc portion thereof, based on the re-approximation section data.

20. The numerical controller according to claim 9, wherein the processor is configured to perform a method comprising:
correcting the machining path at the corner portion and the circular-arc portion thereof, based on the re-approximation section data.

* * * * *